(12) United States Patent
Lee et al.

(10) Patent No.: US 7,780,138 B1
(45) Date of Patent: Aug. 24, 2010

(54) SEAT MOVING TRACK ASSEMBLY

(75) Inventors: Kwang Ju Lee, Seoul (KR); Byung Kwan Cho, Seoul (KR); Gun Young Park, Incheon (KR); Bum-Suk Oh, Incheon (KR); Sung Ha Park, Incheon (KR)

(73) Assignee: Austem Co., Ltd., Chungcheongnam-do (KR)

( * ) Notice: Subject to any disclaimer, the term of this patent is extended or adjusted under 35 U.S.C. 154(b) by 0 days.

(21) Appl. No.: 12/431,557

(22) Filed: Apr. 28, 2009

(30) Foreign Application Priority Data

Mar. 25, 2009 (KR) ...................... 10-2009-0025182

(51) Int. Cl.
F16M 13/00 (2006.01)

(52) U.S. Cl. ..................................... 248/429

(58) Field of Classification Search ................. 248/434, 248/429, 430; 297/344.11, 344.13
See application file for complete search history.

(56) References Cited

U.S. PATENT DOCUMENTS

| 7,506,856 | B2 * | 3/2009 | Ikegaya et al. | 248/430 |
| 7,658,360 | B2 * | 2/2010 | Kojima | 248/429 |
| 7,717,392 | B2 * | 5/2010 | Sakakibara et al. | 248/429 |
| 2002/0190182 | A1 * | 12/2002 | Flick et al. | 248/430 |
| 2006/0022502 | A1 | 2/2006 | Becker et al. | |
| 2008/0048087 | A1 * | 2/2008 | Kojima et al. | 248/430 |
| 2009/0058169 | A1 * | 3/2009 | Soga | 297/463.1 |
| 2009/0322136 | A1 * | 12/2009 | Kazyak et al. | 297/344.1 |

FOREIGN PATENT DOCUMENTS

| JP | 07-246868 | 9/1995 |
| JP | 2002-154356 | 5/2002 |
| JP | 2004-196140 | 7/2004 |
| JP | 2007-126037 | 5/2007 |
| KR | 1020060029520 | 4/2006 |

* cited by examiner

Primary Examiner—Ramon O Ramirez
(74) Attorney, Agent, or Firm—Schmeiser, Olsen & Watts LLP

(57) ABSTRACT

A seat moving track assembly comprising a stationary rail having at a lower part of one side thereof recesses and having at an upper part of the other side thereof openings, a moving rail having first side holes to correspond to the recesses and second side holes to correspond to the openings, a locking member having first stopping protrusions projecting through the first side holes coupled into the recesses and second stopping protrusions projecting through second side holes coupled into the openings, an elastic connecting member having a shaft supporting part to rotatably support the locking member, an elastic pressing part to rotate the locking member, and unlocking means for rotating the locking member in the other direction to release a coupling between the first stopping protrusions and the recesses and a coupling between the second stopping protrusion and the openings, thereby providing stability and a simplified configuration.

11 Claims, 17 Drawing Sheets

[Figure 1]
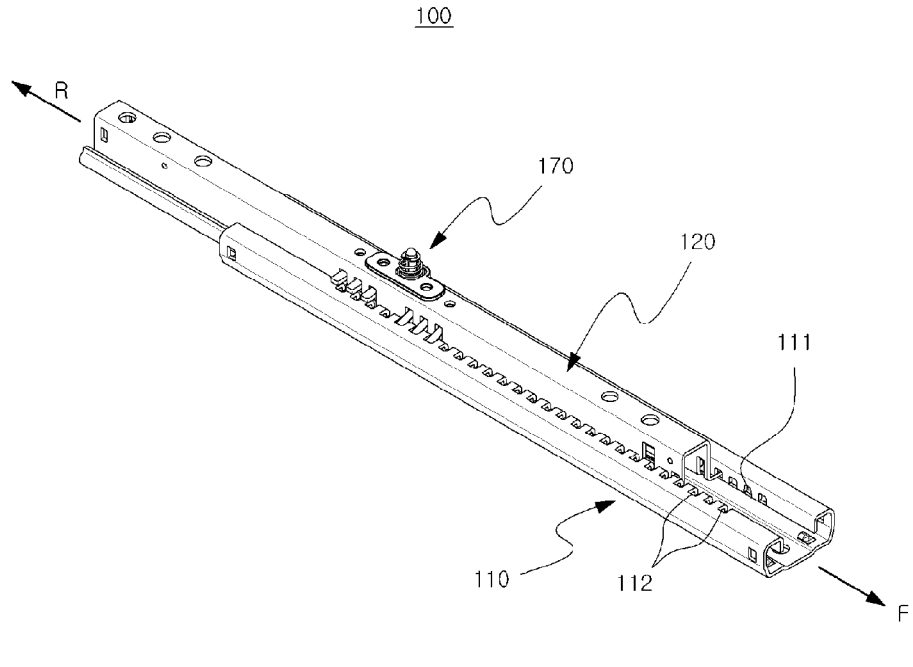

[Figure 2]
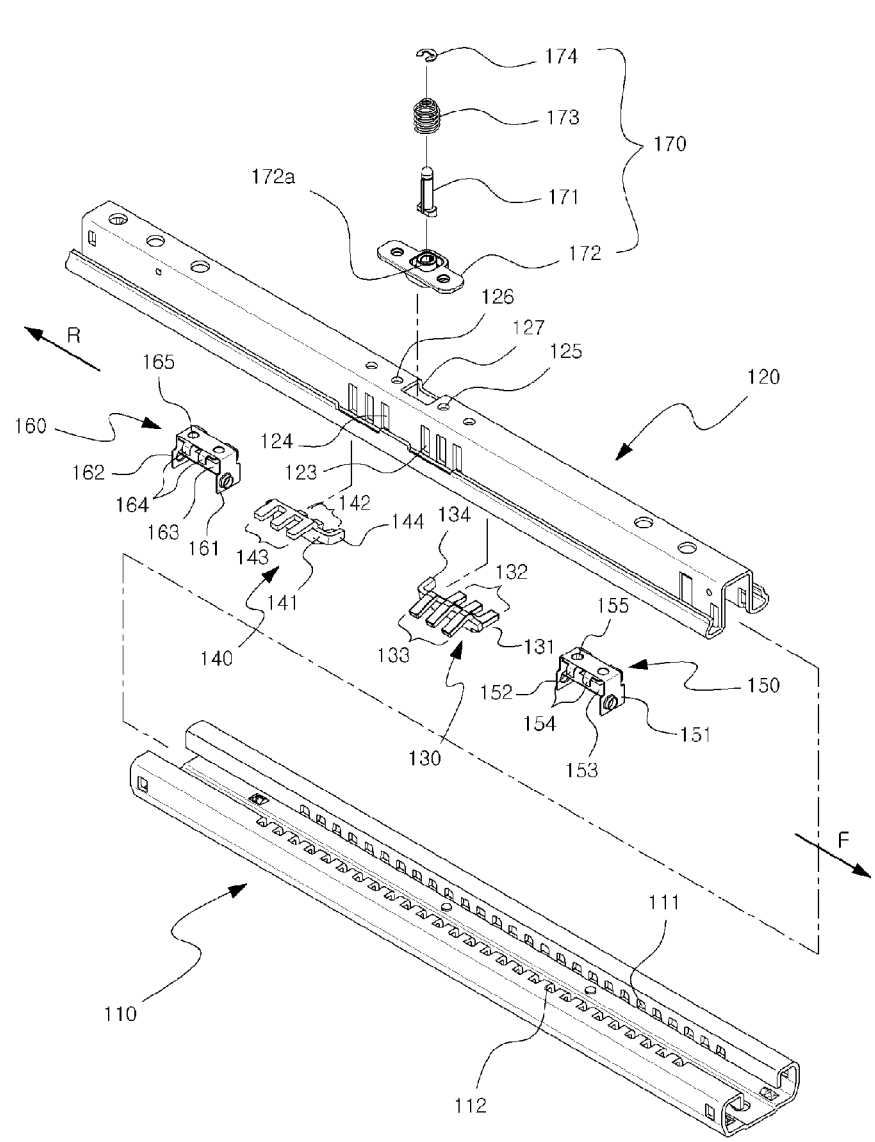

【Figure 3】
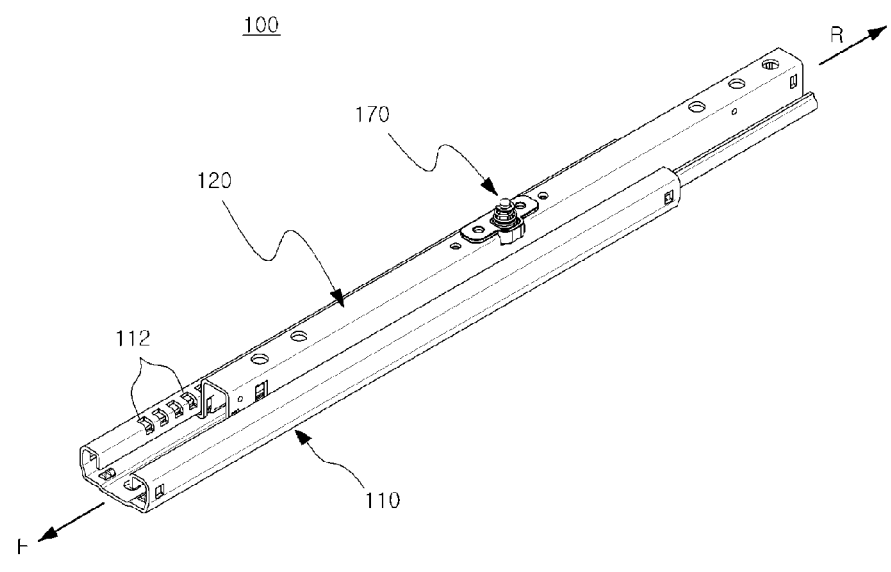

[Figure 4]
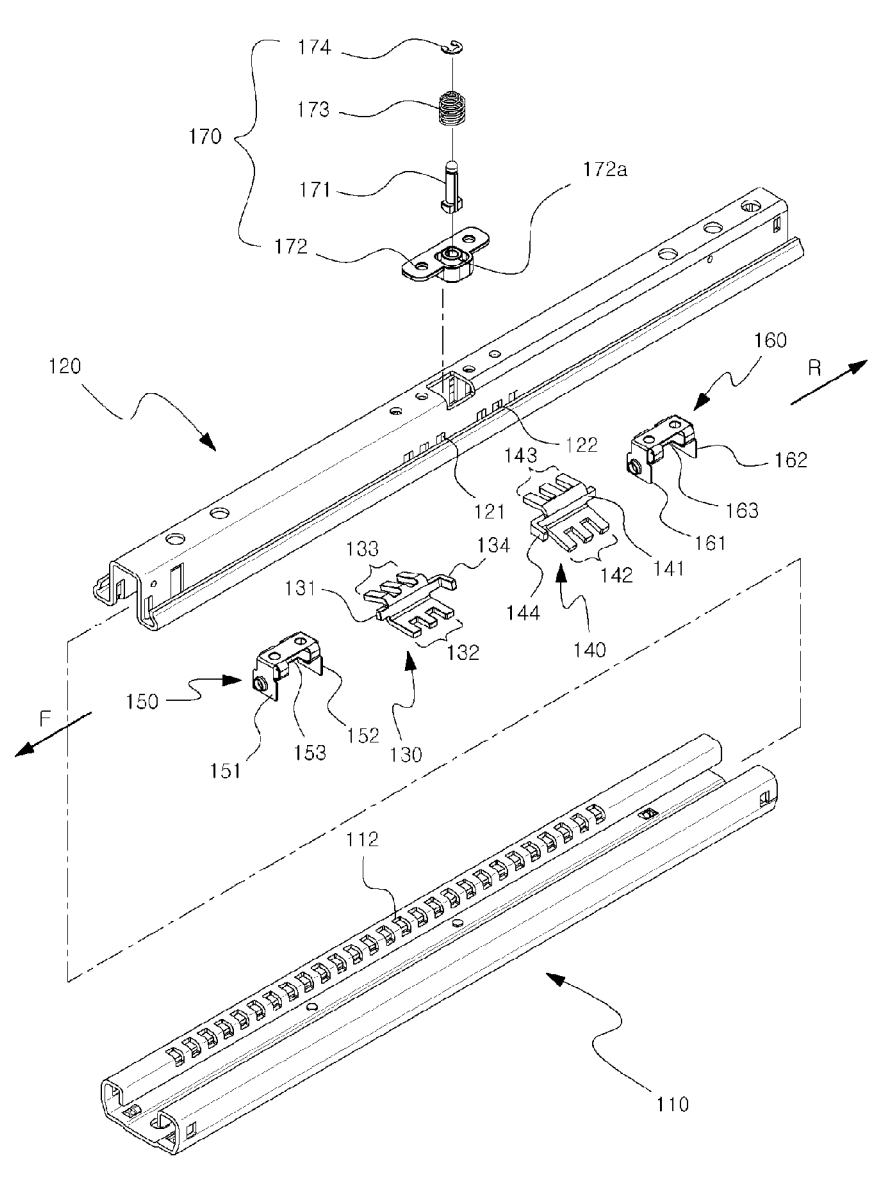

【Figure 5A】
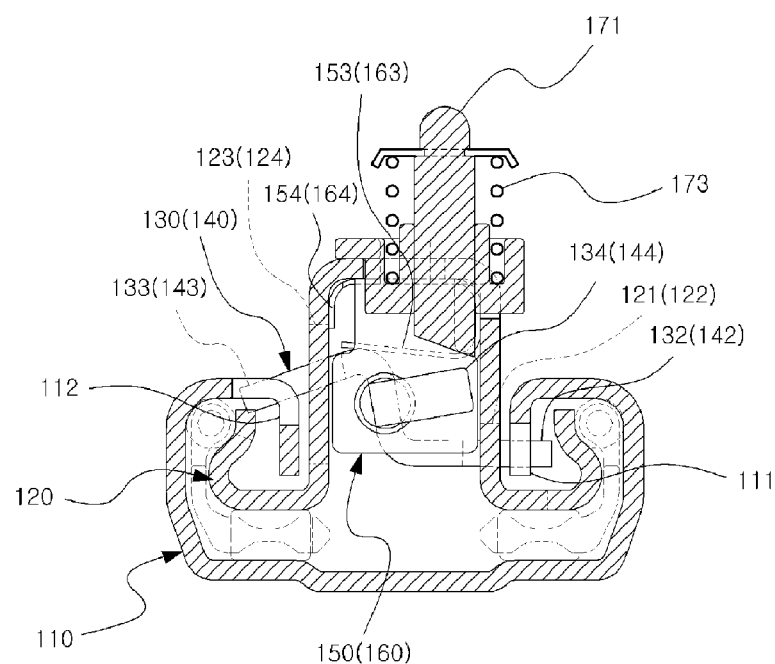
【Figure 5B】
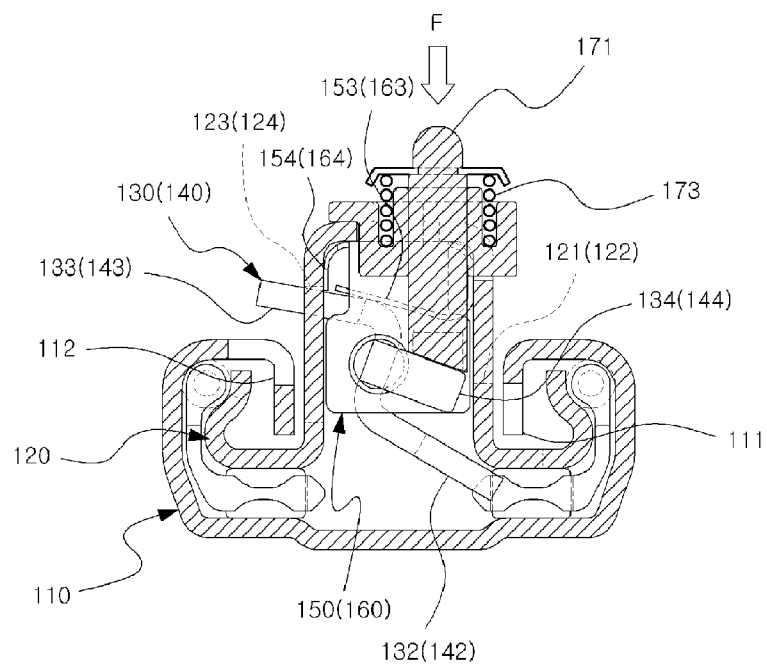

【Figure 6A】
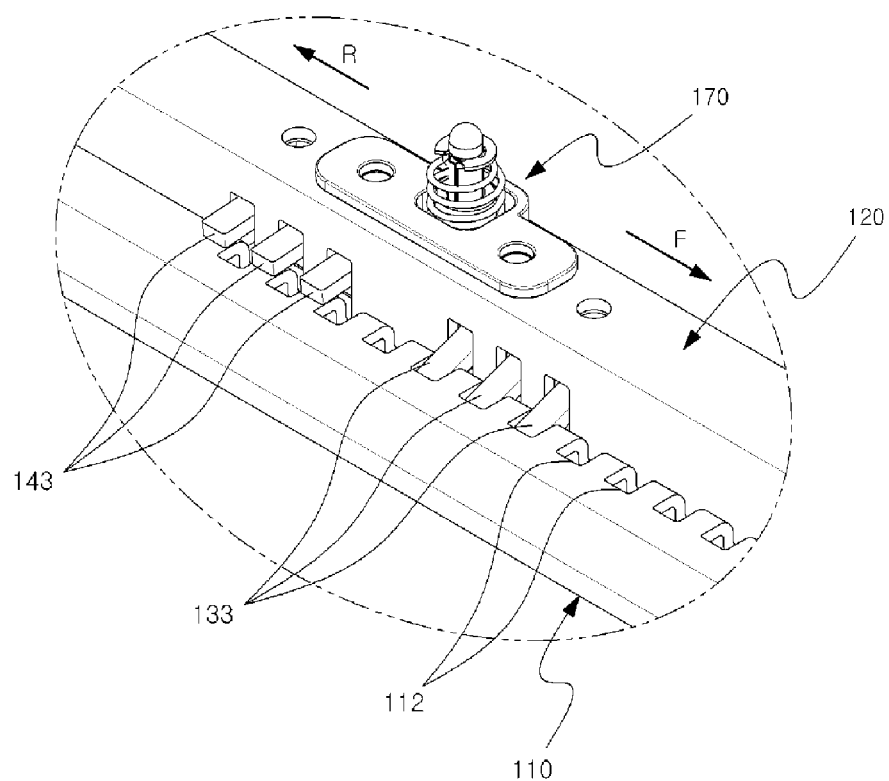

【Figure 6B】
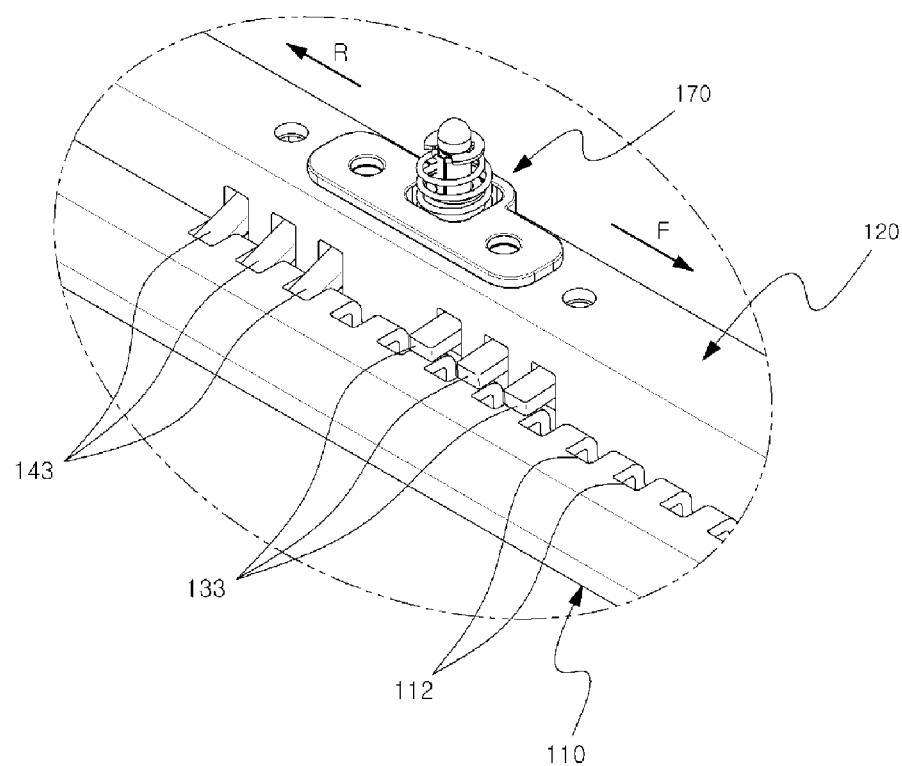

[Figure 7]
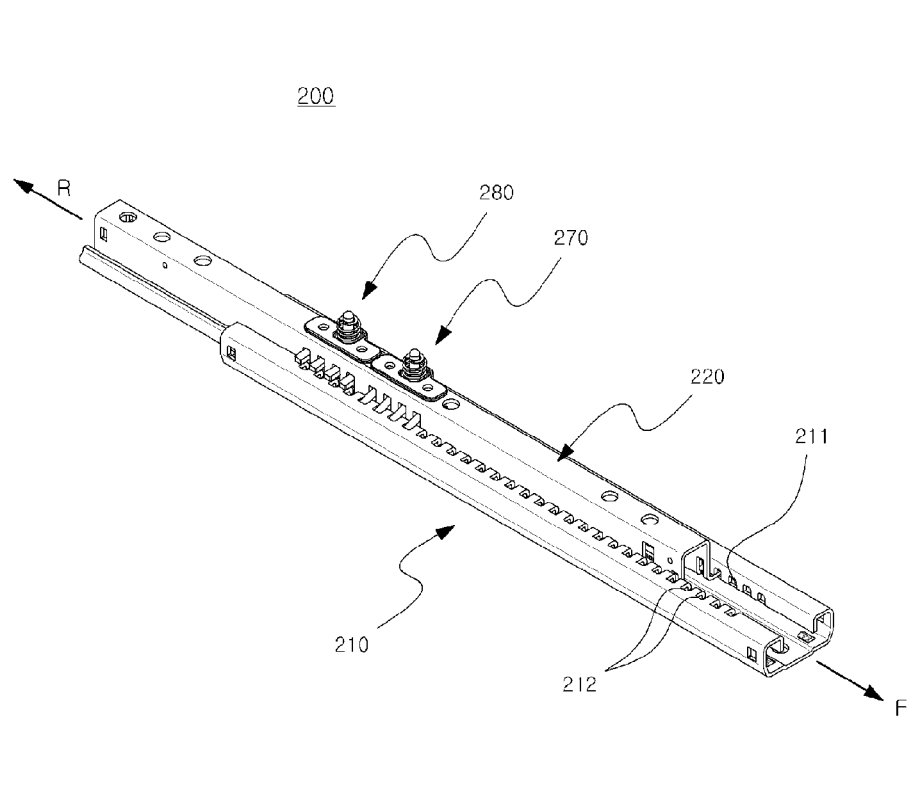

[Figure 8]
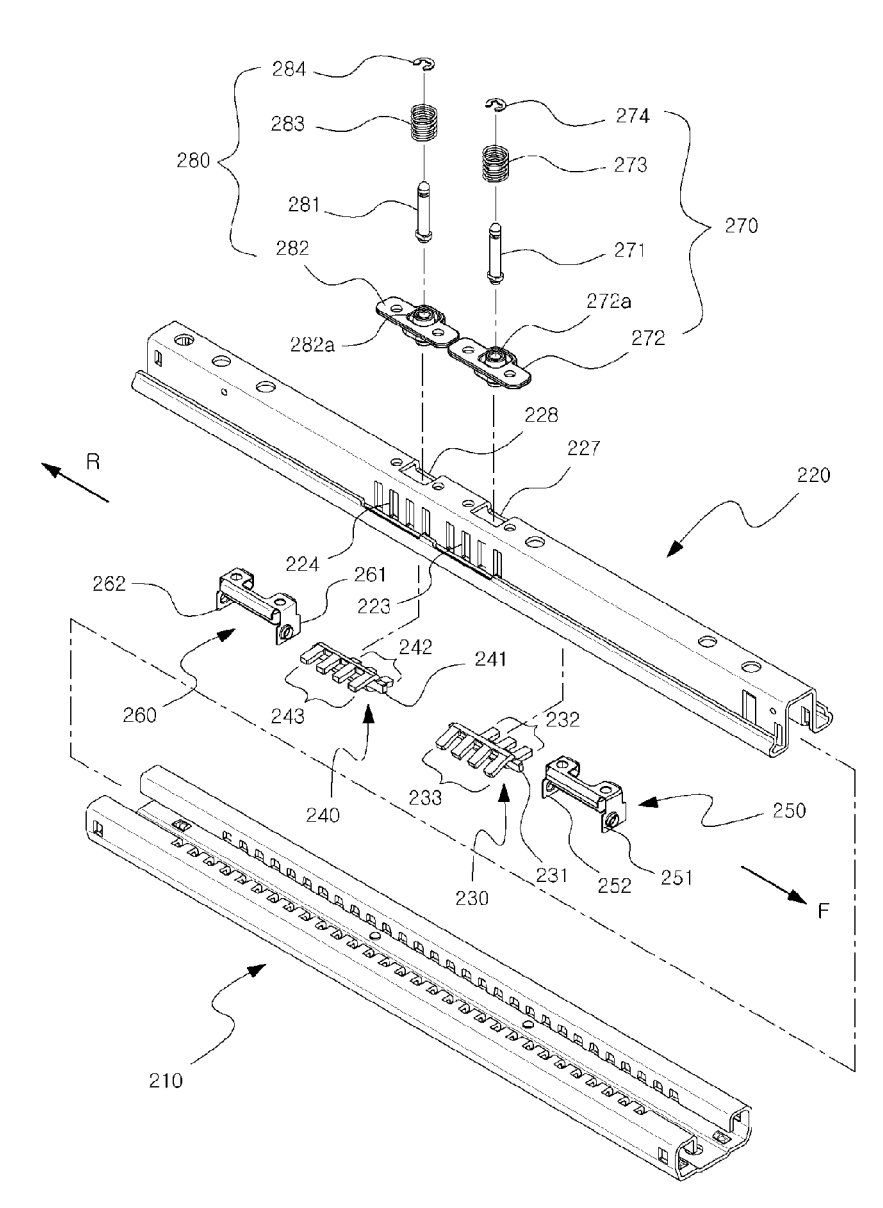

【Figure 9】
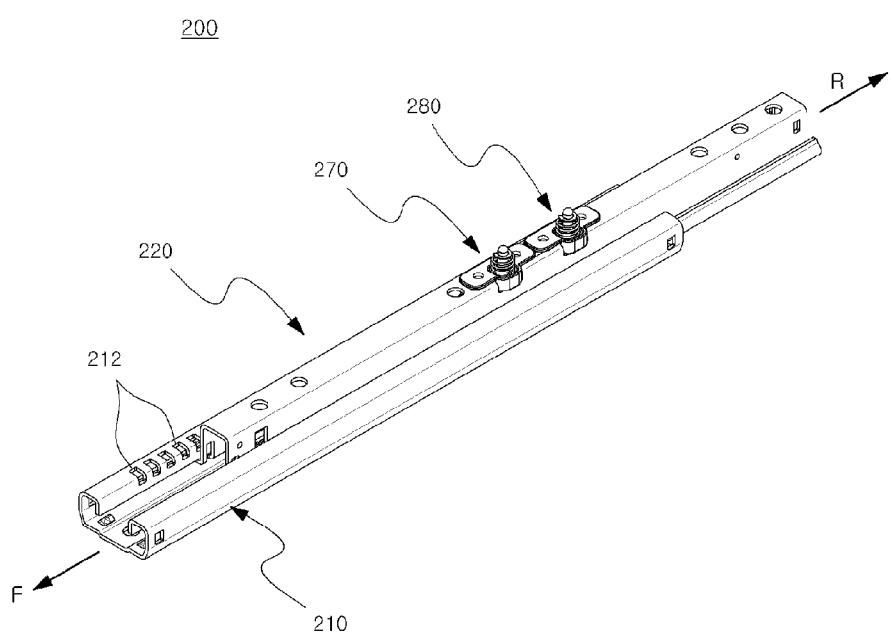

[Figure 10]
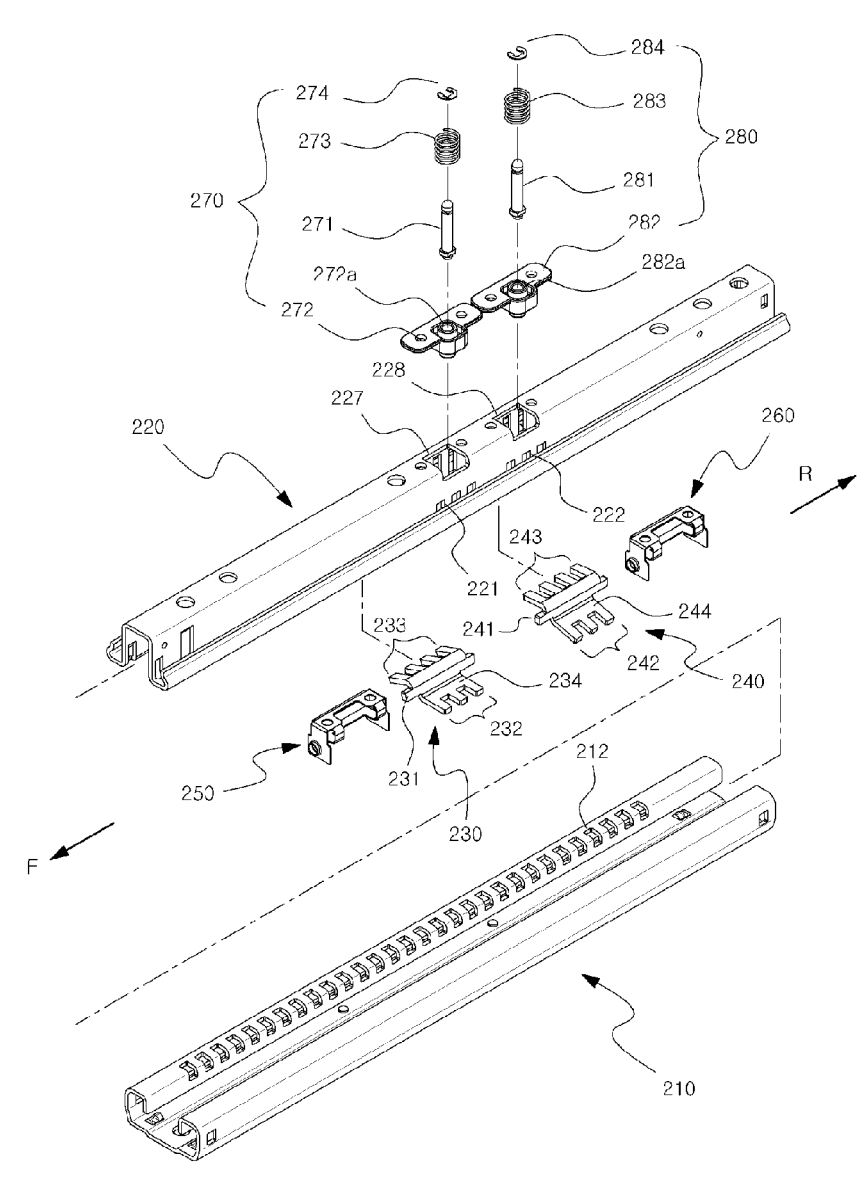

[Figure 11A]
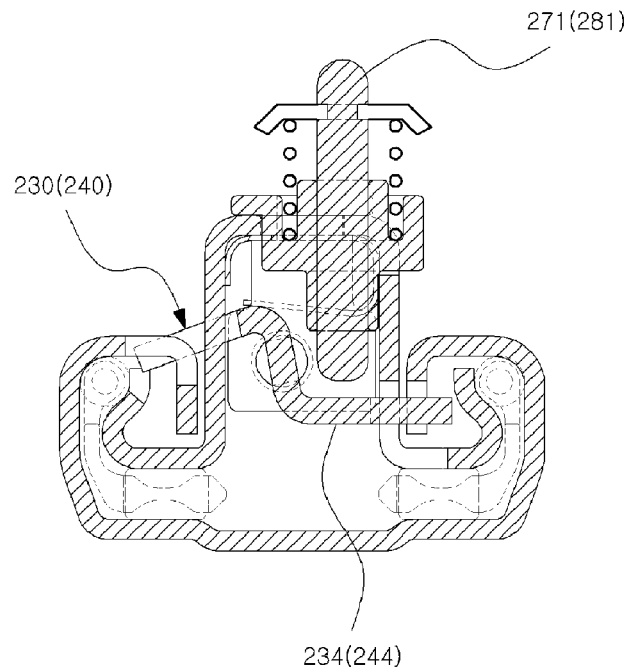
[Figure 11B]
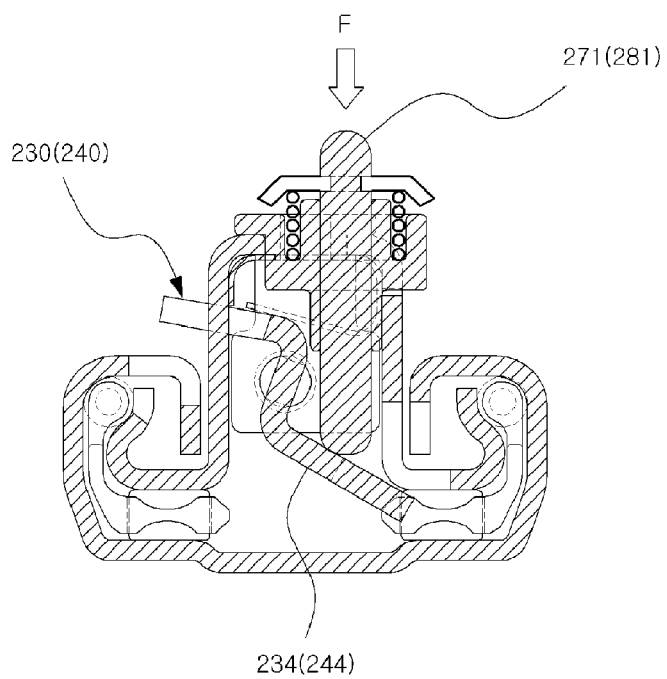

【Figure 12】
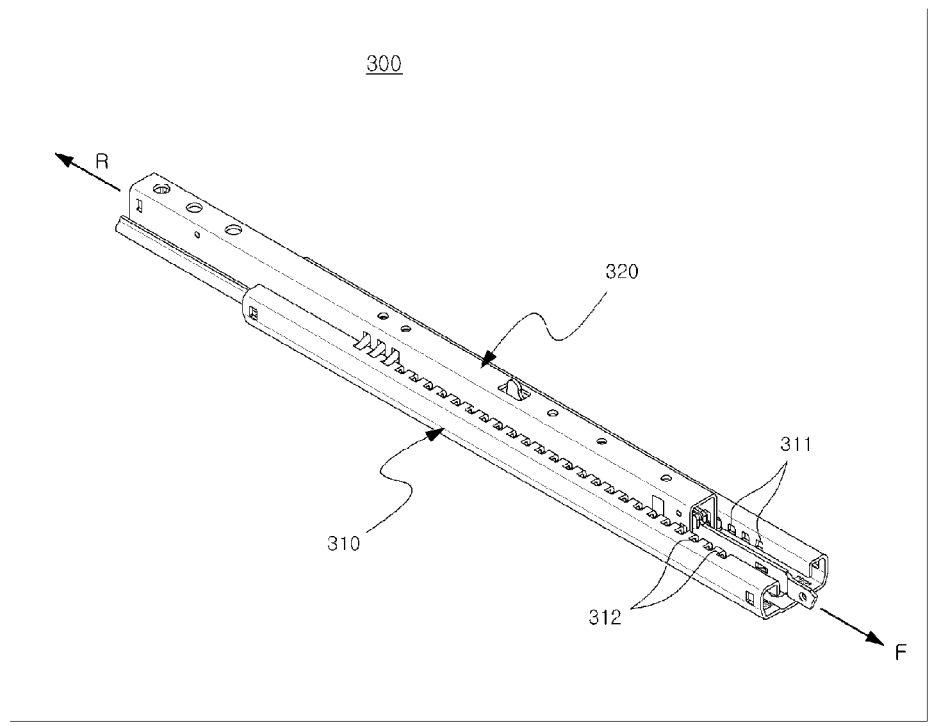

[Figure 13]
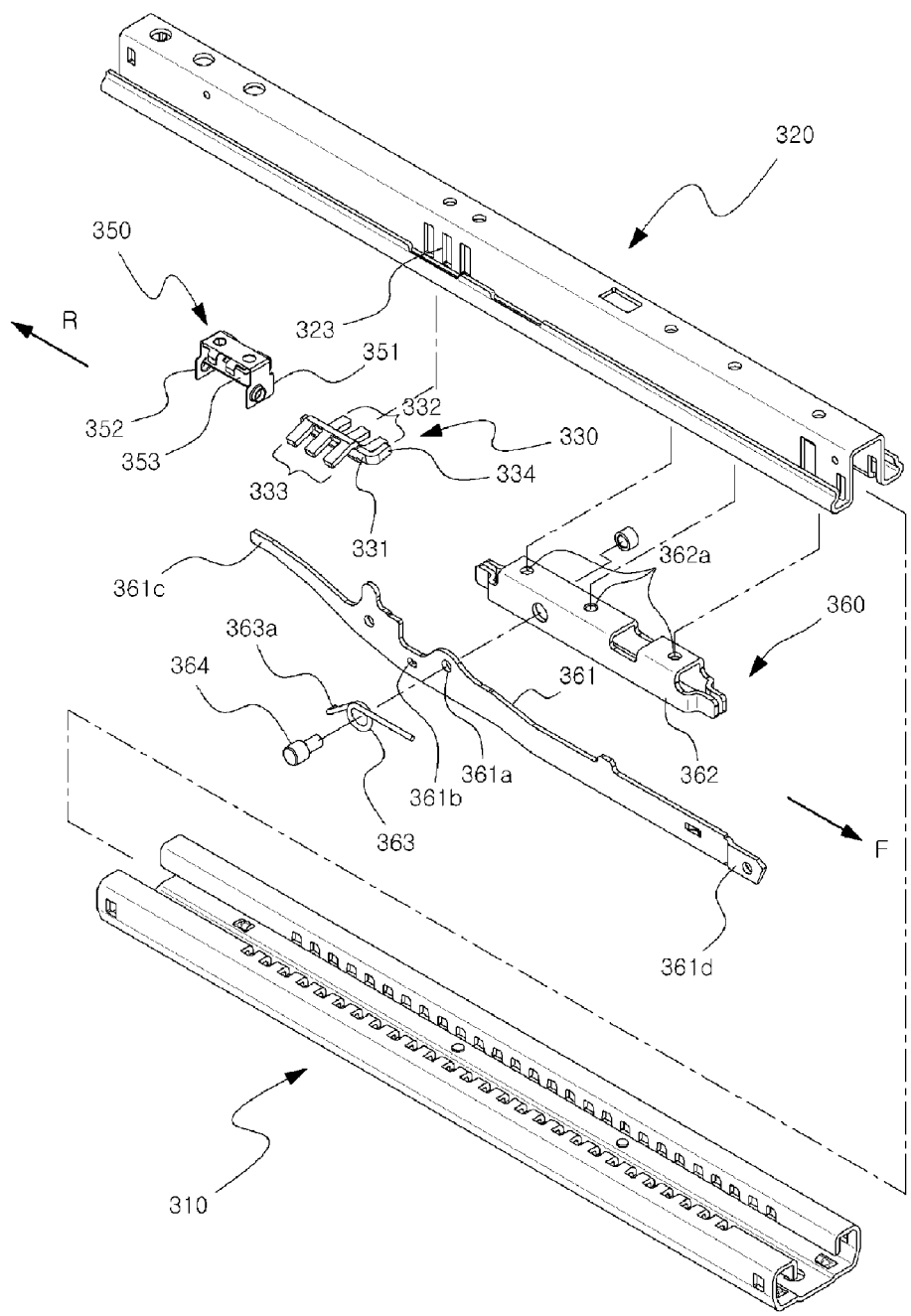

[Figure 14]
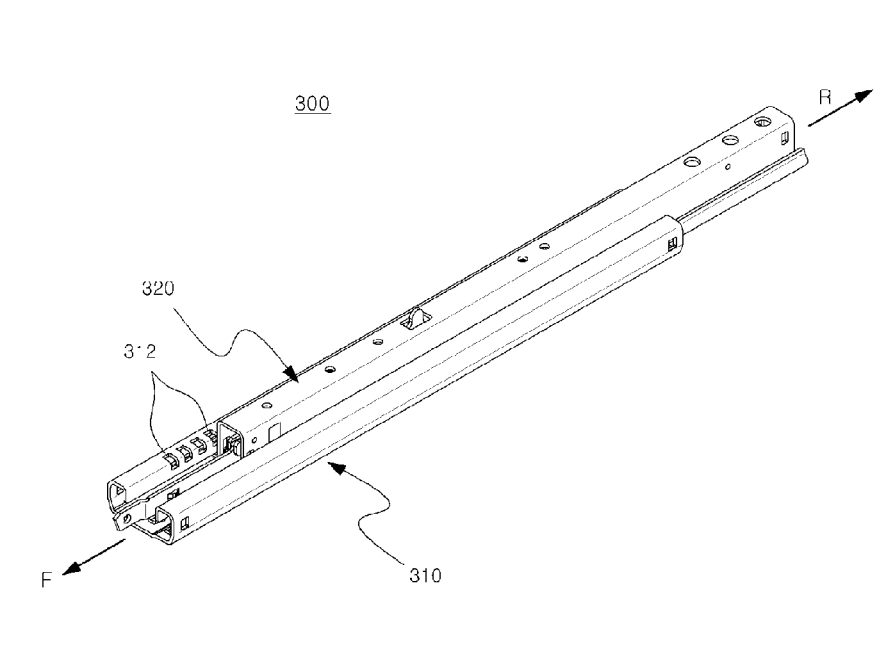

【Figure 15】
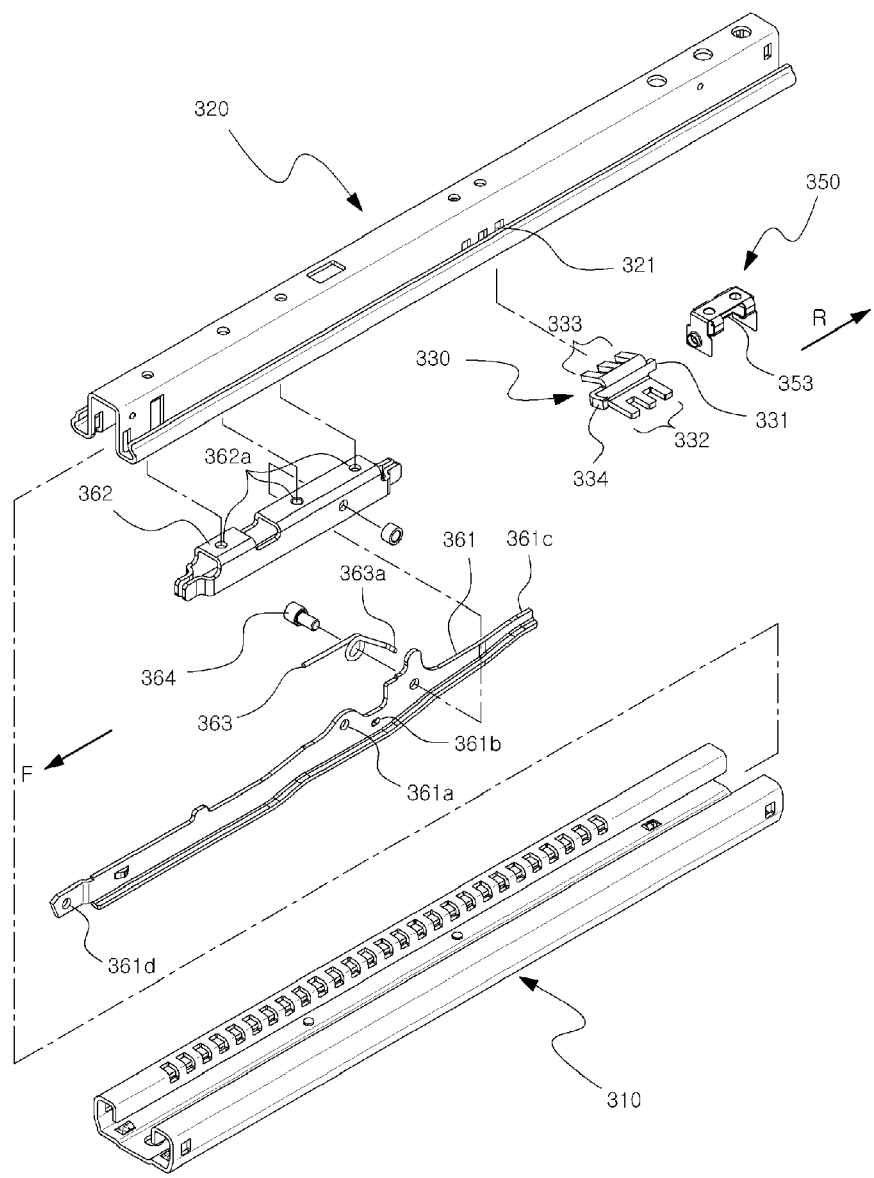

【Figure 16A】
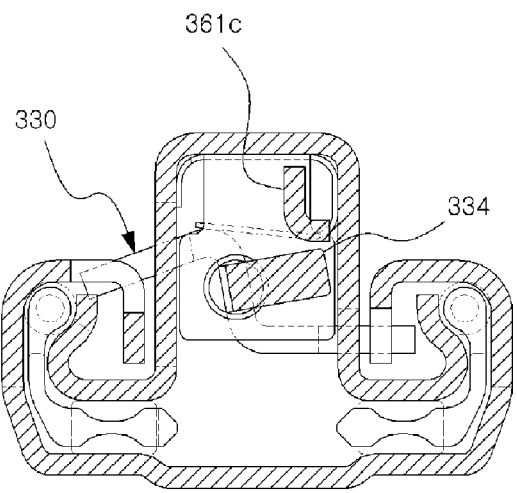
【Figure 16B】
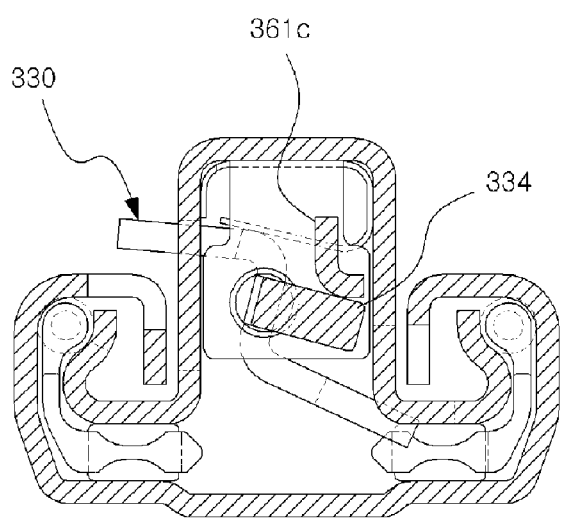

SEAT MOVING TRACK ASSEMBLY

TECHNICAL FIELD

The present invention relates to a seat moving track assembly for a vehicle, and more particularly to a seat moving track assembly having a simple configuration, a space efficiency and a more stable locking configuration.

BACKGROUND ART

Related to a vehicle technology field, various shapes and configurations for a seat moving apparatus have been proposed and developed. Especially, in a recent time, in the vehicle technology field including a seat technology, a lot of times and efforts are provided in the development of a technology minimizing the number of components thereof while obtaining substantially the same effects as a conventional configuration or an more improved effect therethan.

Especially, in a field related to a seat moving track assembly, technologies on a track apparatus for smoothing its movement and a locking apparatus for stably coupling the seat to a track have been widely developed.

A patent related to these technologies is disclosed in Korean Patent First Publication No. 2004-55662. A seat moving assembly according to the patent includes a lower rail having a U-shaped section and an upper rail having a reverse U-shaped section. The seat moving assembly includes a separate locking plate which secures locking of the upper rail onto the lower rail. At the same time, the position of the locking plate is allowed to be changed so that the lower rail and the upper rail can be easily coupled. However, since the patent additionally uses the locking plate, number of components of the seat moving assembly increases, and this increased number of the components fails to satisfy the current technology development tendency for improving a function with a decreased components number.

Another patent is disclosed in American Patent First Publication No. 2006-22502. A seat guide for a vehicle according to the patent includes upper and lower rails respectively having L shape so that the number of components can be decreased. However, since the patent uses the upper and lower rails having the L shapes respectively, manufacturing cost thereof is more than that of the conventional U-shaped rail. Also, since a single locking member is used, coupling stability is deteriorated.

DISCLOSURE

Technical Problem

It is an aspect of the present invention to provide a seat moving track assembly which can solve the above problems and have stability as well as a simplified configuration.

Technical Solution

The foregoing and/or other aspects of the present invention can be achieved by providing a seat moving track assembly, comprising: a stationary rail which has a channel configuration, and has at a lower part of one side thereof recesses formed successively in a lengthwise direction with a uniform pitch and has at an upper part of the other side thereof openings formed successively with the same pitch as the recesses; a moving rail which is disposed inside of the stationary rail and has a channel configuration to be movably coupled to the stationary rail, and which has at a lower part of one side thereof first side holes to correspond to the recesses and has at an upper part of the other side thereof second side holes to correspond to the openings; a locking member which is rotatably disposed inside of the moving rail and which has, when rotated in one direction, a plurality of first stopping protrusions projecting through the first side holes to be coupled into the recesses of the stationary rail and a plurality of second stopping protrusions projecting through the second side holes to be coupled into the openings of the stationary rail; an elastic connecting member which is mounted inside of the moving rail and has a shaft supporting part to rotatably support the locking member and an elastic pressing part to rotate the locking member in one direction; and unlocking means which has an operating pin slid by an outer force and rotating the locking member in the other direction to release a coupling between the first stopping protrusions and the recesses and a coupling between the second stopping protrusion and the openings, a connecting block mounted on the moving rail to guide a sliding of the operating pin, and a return spring coupled to the connecting block to support the operating pin.

According to an aspect of the present invention, the locking member has a connecting shaft part rotatably coupled to the shaft supporting part of the elastic connecting member and an input end extending perpendicular from an end part of the connecting shaft part, the unlocking means rotates the locking member in the other direction by the operating pin pressing the input end.

According to an aspect of the present invention, the locking member and the elastic connecting member are provided as a plural number respectively to be disposed and mounted front and rear also symmetrically therebetween, a plurality of the first side holes and a plurality of the second side holes of the moving rail are provided as a pair respectively to correspond to the locking members and the elastic connecting members, the operating pin presses the input ends of a pair of the locking members together and rotates a pair of the locking members together in the other direction.

According to an aspect of the present invention, a plurality of the first stopping protrusions and a plurality of the second protrusions of the locking members have within one locking member the same pitch as the recesses and the openings respectively, but between the locking members there are 180 degree phase differences in the pitches between the first stopping protrusions and between the second stopping protrusions.

According to an aspect of the present invention, the locking member has a connecting shaft part rotatably coupled to the shaft supporting part of the elastic connecting member and an input extending part formed between the connecting shaft part and the first stopping protrusion, the unlocking means rotates the locking member in the other direction by the operating pin pressing the input extend part.

According to an aspect of the present invention, the locking member and the elastic connecting member are provided as a plural number respectively to be disposed and mounted front and rear therebetween, the first side holes and the second side holes of the moving rail are provided as a pair respectively to correspond to the locking members and the elastic connecting members.

According to an aspect of the present invention, the unlocking means is provided as a plural number to correspond to each locking member.

According to an aspect of the present invention, the locking members and the elastic connecting members are disposed and mounted front and rear as a pair respectively along the moving rail, a plurality of the first stopping protrusions and a plurality of the second protrusions of the locking members have within one locking member the same pitch as the recesses and the openings respectively, but between the locking members there are 180 degree phase differences in the pitches between the first stopping protrusions and between the second stopping protrusions.

The foregoing and/or other aspects of the present invention can be achieved by providing a seat moving track assembly, comprising: a stationary rail which has a channel configuration, and has at a lower part of one side thereof recesses formed successively in a lengthwise direction with a uniform pitch and has at an upper part of the other side thereof openings formed successively with the same pitch as the recesses; a moving rail which is disposed inside of the stationary rail and has a channel configuration to be movably coupled to the stationary rail, and which has at a lower part of one side thereof first side holes to correspond to the recesses and has at an upper part of the other side thereof second side holes to correspond to the openings; a locking member which is rotatably disposed inside of the moving rail and which has, when rotated in one direction, a plurality of first stopping protrusions projecting through the first side holes to be coupled into the recesses of the stationary rail and a plurality of second stopping protrusions projecting through the second side holes to be coupled into the openings of the stationary rail; an elastic connecting member which is mounted inside of the moving rail and has a shaft supporting part to rotatably support the locking member and an elastic pressing part to rotate the locking member in one direction; and unlocking means which has an operating lever disposed inside of the moving rail and pressed and rotated by an outer force thus rotating the locking member in the other direction to release a coupling between the first stopping protrusions and the recesses and a coupling between the second stopping protrusion and the openings, a connecting bracket mounted inside of the moving rail to support a rotation of the operating lever, and a return spring coupled to the connecting bracket to support the operating lever.

According to an aspect of the present invention, the locking member has a connecting shaft part rotatably coupled to the shaft supporting part of the elastic connecting member and an input end extending perpendicular from an end part of the connecting shaft part, the unlocking means rotates the locking member in the other direction by an end of the operating lever pressing the input end.

ADVANTAGEOUS EFFECTS

The seat moving track assembly according to the present invention described above simplifies the configuration of the locking member and the configuration of the rail corresponding thereto, thereby performing an improved stability, and substantially reducing the number of components in comparison with the conventional configuration.

Also, by means of the above configuration having the above technical advantages, the shapes of the stationary rail and the moving rail are substantially the same as those of the conventional rails, so that a technical compatibility with the conventional technology can be maintained.

Also, according to the seat moving track assembly of the present invention, a dual coupling between the stationary rail and the moving rail can be preformed by forming stopping protrusions at both sides of the locking member thus enabling a more stable coupling between the two rails.

Also, according to the seat moving track assembly of the present invention, an elastic connecting member gives an elastic force onto the locking member as well as it supports the locking member rotatably thus minimizing the number of components of the seat moving track assembly.

Also, according to the seat moving track assembly of the present invention, a rotation of the locking member which is provided inside of the moving rail can be performed by an input end or an input extending part each of which is extendingly formed on the locking member and an operating pin or an operating lever of an unlocking means which is mounted on the moving rail, so that an overall configuration can be simplified and an operating stability can be ensured.

Also, according to the seat moving track assembly of the present invention, as a locking is performed by a pair of the locking members and a pair of the elastic connecting members each supporting its corresponding locking member, the operating stability is further ensured. Especially, a pitch between the pair of the locking members has a 180 degree phase difference from the pitch of a recess or an opening of the stationary rail, so that a locking interval between the moving rail and the stationary rail can be reduced to a half of the pitch.

DESCRIPTION OF DRAWINGS

FIG. 1 is a perspective view of a seat moving track assembly according to a first exemplary embodiment of the present invention;

FIG. 2 is an exploded view of the seat moving track assembly of FIG. 1;

FIG. 3 is a perspective view of the seat moving track assembly of FIG. 1 when seen in a different direction;

FIG. 4 is an exploded view of the seat moving track assembly of FIG. 3;

FIG. 5A and FIG. 5B are sectional views respectively showing a locking state and an unlocking state of the seat moving track assembly of FIG. 1;

FIG. 6A and FIG. 6B are respectively perspective views showing actual operations of a principal part of the seat moving track assembly of FIG. 1 at its locking state;

FIG. 7 is a perspective view of a seat moving track assembly according to a second exemplary embodiment of the present invention;

FIG. 8 is an exploded view of the seat moving track assembly of FIG. 7;

FIG. 9 is a perspective view of the seat moving track assembly of FIG. 7 when seen in a different direction;

FIG. 10 is an exploded view of the seat moving track assembly of FIG. 9;

FIG. 11A and FIG. 11B are sectional views respectively showing a locking state and an unlocking state of the seat moving track assembly of FIG. 7;

FIG. 12 is a perspective view of a seat moving track assembly according to a third exemplary embodiment of the present invention;

FIG. 13 is an exploded view of the seat moving track assembly of FIG. 12;

FIG. 14 is a perspective view of the seat moving track assembly of FIG. 12 when seen in a different direction;

FIG. 15 is an exploded view of the seat moving track assembly of FIG. 14; and

FIG. 16A and FIG. 16B are sectional views respectively showing a locking state and an unlocking state of the seat moving track assembly of FIG. 12.

BEST MODE

Hereinafter, exemplary embodiments of the present invention will be described by referring to the accompanying figures.

As shown in FIGS. 1 to 4, a seat moving track assembly according to a first exemplary embodiment of the present invention comprises a lower stationary rail 110 which is mounted on a vehicle body part, an upper moving rail 120 which is mounted on a seat part and is movably coupled to the stationary rail 110, a pair of locking members 130 and 140 which are disposed inside of the moving rail 120, a pair of elastic connecting members 150 and 160 which are mounted inside of the moving rail 120 to support the locking members 130 and 140, and unlocking means 170 for operating a pair of the locking members 130 and 140.

The stationary rail 110 has a channel configuration. Also, as shown in FIG. 2, the stationary rail 110 has recesses 111 at its inner and right lower side. The recesses 111 are formed successively with a uniform pitch therebetween in an extending direction of the rail 110.

As shown in FIG. 2 and FIG. 4, the stationary rail 110 has openings 112 at its inner and left upper side. The openings 112 are formed successively with the same uniform pitch as the recesses 111 in the extending direction of the rail 110.

The recesses 111 and the openings 112 are positioned to correspond one to one therebetween in the extending direction of the rail 110.

The moving rail 120 is disposed inside of the stationary rail 110 and has a channel configuration to be movably coupled to the stationary rail 110. As shown in FIG. 4, the moving rail 120 has at its right side and a center part thereof first side holes 121 and 122 which consist of three holes respectively and form a pair located front and rear. The first side holes 121 and 122 are formed to correspond to the recesses 111 of the stationary rail 110 respectively and have the same pitch as the recesses 111. However, as will be described later, there is a 180 degree phase difference in the pitch between the first side holes 121 and 122.

Also, as shown in FIG. 2, at the center part of the left side of the moving rail 120 are formed second side holes 123 and 124 which consist of three enlarged holes respectively and form a pair located front and rear. A pair of the second side holes 123 and 124 are formed to correspond to the openings 112 of the stationary rail 110 respectively and have the same pitch as the openings 112. However, in common with the first side holes 121 and 122, as will be described later, there is a 180 degree phase difference in the pitch between the second side holes 123 and 124.

As shown in FIG. 2 and FIG. 4, a pair of the locking members 130 and 140 have bar-shaped connecting shaft parts 131 and 141 which extend lengthwise in the direction of the moving rail 120, three first stopping protrusions 132 and 142 which are formed at right sides of the connecting shaft parts 131 and 141, and three second stopping protrusions 133 and 143 which are formed at left sides of the connecting shaft parts 131 and 141.

The locking member 130 located at front side has an input end 134 which extends perpendicular from a rear end part of the connecting shaft part 131. The locking member 140 located at rear side has an input end 144 which extends perpendicular from a front end part of its corresponding connecting shaft part 141.

As shown in FIG. 2 and FIG. 4, a pair of the elastic connecting members 150 and 160 have shaft supporting parts 151, 152 and 161, 162 at both of their front and rear end parts to rotatably support the connecting shaft parts 131 and 141 of the corresponding locking member 130 and 140 respectively.

Also, the elastic connecting members 150 and 160 have elastic pressing parts 153 and 163 at their right sides and position retaining parts 154 and 164 at their left sides. As shown in FIGS. 5A and 5B, when the elastic connecting members 150 and 160 are coupled to the locking members 130 and 140, the elastic pressing parts 153 and 163 elastically press the locking members 130 and 140 to rotate counterclockwise. The position retaining parts 154 and 164 guide the elastic connecting members 150 and 160 to be safely received at a right position in the moving rail 120.

A pair of the elastic connecting members 150 and 160 are accommodated in the moving rail 120 and mounted thereon by blind riveting through mounting holes 155 and 165 which have been adjusted to correspond to receiving holes 125 and 126 of the moving rail 120.

The locking members 130 and 140 are rotatably inserted into the elastic connecting members 150 and 160 which are mounted as described above.

In this case, the input ends 134 and 144 of the locking members 130 and 140 are located to face each other.

The unlocking means 170 comprises an operating pin 171, a connecting block 172, a return spring 173, etc. The connecting block 172 is mounted on an opening part 127, the operating pin 171 is inserted into a guide cylinder 172a of the connecting block 172 to slide up and down. The return spring 172 presses the operating pin 171 upwardly to restore its position. A washer 174 is coupled to a top end part of the operating pin 171 to prevent a separation of the return spring 173.

Hereinafter, an operation of the seat moving track assembly 100 according to the first exemplary embodiment of the present invention having the above configuration will be described with reference to FIGS. 5A and 5B.

FIG. 5A shows a locking state of the seat moving track assembly 100 and FIG. 5B shows an unlocking state thereof.

In the locking state of FIG. 5A, the first stopping protrusion 132 and the second stopping protrusion 133 are laterally projected through the first and second side holes 121 and 123 of the moving rail 120 to be coupled into the recess 111 and the opening 112 respectively.

In this case, if the operating pin 171 is lowered by an outer force (refer to F in FIG. 5B) to press the input end 134 of the locking member 130, the locking member 130 rotates clockwise and the first and second stopping protrusions 133 and 143 escape from the recess 111 and the opening 112 of the stationary rail 110 respectively thus making the unlocking state as shown in FIG. 5B. In the unlocking state, the moving rail 120 can freely slide on the stationary rail 110.

In the unlocking state, if the outer force F is removed, the operating pin 171 is lifted by the return spring 173 and the locking member 130 rotates back counterclockwise due to the elastic pressing part 153 of the elastic connecting member 150, thus making the locking state as shown in FIG. 5A.

In the seat moving track assembly 100 according to the first exemplary embodiment of the present invention described above, a pair of the locking members 130 and 140 have a plurality of the first stopping protrusions 132 and 142 and a plurality of the second stopping protrusions 133 and 143 all of which have the same pitch as the recesses 111 and the openings 112. However, between the locking members 130 and 140, the pitches between the first stopping protrusions 132 and 142 have the opposite, that is, 180 degree phase difference. Also, between the second stopping protrusions 133 and 143, there is 180 degree phase difference in their pitches.

Accordingly, the locking state of FIG. 5A can be accomplished by only one of the locking members 130 and 140.

That is, the locking state can be shown either as FIG. 6A or as FIG. 6B.

In the locking state of FIG. 6A, the second stopping protrusion 133 of the locking member at the front side (refer to 130 in FIG. 2) is coupled to the opening 112 of the stationary rail 110. On the contrary, in the locking state of FIG. 6B, the second stopping protrusion 143 of the locking member at the rear side (refer to 140 in FIG. 2) is coupled to the opening 112 of the stationary rail 110.

These locking states are due to a fact that though a pair of the second protrusions 133 and 143 have the same pitch with the opening 112 of the stationary rail 110 individually, there is the phase difference of ½ pitch between the second stopping protrusions 133 and 143.

That is, for example, if the pitch of the opening 112 of the stationary rail 110 is 10 [mm], the front three second stopping protrusions 133 and the rear three second stopping protrusions 143 have a pitch of 10 [mm] respectively. However, there is a distance of 10N+5 [mm] (where, N is a natural number) between the front second stopping protrusion 133 and the rear second stopping protrusion 143 thus making the phase difference of ½ pitch, that is, 5 [mm].

If a pair of the locking members 130 and 140 have the first and the second stopping protrusions 133 and 143 between which the there is a phase difference of ½ pitch, that is, 180 degrees as described above, a unit displacement of the moving rail 120 when locked to the stationary rail 110 is reduced by half from 1 pitch to ½ pitch (in the above case, from 10 [mm] to 5 [mm]).

Therefore, the unit displacement of the moving rail 120 when provided with a pair of the locking members 130 and 140 having ½ pitch phase difference therebetween can be a half of the unit displacement of the moving rail 120 when provided with a single locking member 130, so that a user can slide and adjust his/her seat more accurately to a required position.

The locking state can be embodied as in either FIG. 6A or FIG. 6B as described above. On the other hand, the unlocking state always has the two locking members 130 and 140 both of which are operated as shown in FIG. 5B. That is, when conversion into the unlocking state occurs, the single operating pin 171 presses and rotates the input ends 134 and 144 of the locking members 130 and 140 together (refer to FIG. 2).

As shown in FIGS. 7 to 10, a seat moving track assembly according to a second exemplary embodiment of the present invention comprises a lower stationary rail 210 which is mounted on a vehicle body part, an upper moving rail 220 which is mounted on a seat part and is movably coupled to the stationary rail 210, a pair of locking members 230 and 240 which are disposed inside of the moving rail 220, a pair of elastic connecting members 250 and 260 which are mounted inside of the moving rail 220 to support the locking members 230 and 240, and unlocking means 270 and 280 which are mounted on the moving rail 220 for operating a pair of the locking members 230 and 240.

In this embodiment of the present invention, descriptions for the same components as in the first exemplary embodiment will be omitted.

Moving rail 220 has two opening parts 227 and 228 front and a rear therebetween and the unlocking means 270 and 280 are mounted on the opening parts 227 and 228.

That is, in both of the unlocking means 270 and 280, connecting blocks 272 and 282 are mounted on the opening parts 227 and 228 of the moving rail 220, the operating pins 271 and 281 are inserted into guide cylinders 272a and 282a of the corresponding connecting blocks 272 and 282 to slide up and down. Also, return springs 273 and 283 press the corresponding operating pins 271 and 281 upwardly to restore their positions. Washers 274 and 284 are coupled to top end parts of the corresponding operating pins 271 and 281 to prevent separation of the return springs 273 and 283.

However, differently from those in the first exemplary embodiment, the locking members 230 and 240 don't have input ends (refer to 134 in FIG. 2) but have input extending parts 234 and 244 extending between the corresponding connecting shaft parts 231, 241 and the first stopping protrusions 232, 242.

The operating pins 271 and 281 of the unlocking means 270 and 280 rotate the locking members 230 and 240 by pressing the input extending parts 234 and 244.

FIG. 11A shows a locking state of the seat moving track assembly 200 and FIG. 11B shows an unlocking state thereof.

As shown in the FIGS. 11A and 11B, when lowered, the operating pin 271 contacts and presses the input extending part 234 of the locking member 230 thus rotating the locking member 230 in an unlocking direction.

In an unlocking operation, both operating pins 271 and 281 are lowered by an outer force.

Although two locking members 230, 240 and two unlocking means 270, 280 are provided in the seat moving track assembly 200 according to this embodiment, the number of these components is not limited to 2 but can be 3 or more.

Of course, the locking members 230 and 240 may have no phase difference between first stopping protrusions 232, 242 and second stopping protrusions 233, 243 so that they can lock or unlock at the same time. Or, one, two or more of the stopping protrusions restrictively may have a pitch of the same phase therebetween but have the pitch of 180 degree phase difference with the other stopping protrusion(s) by which the locking and unlocking operation will be achieved in an opposite way.

There is a 180 degree phase difference of the pitch between the first stopping protrusions 232, 233 and the second stopping protrusions 242, 243 of which the description is substantially the same as those in the first embodiment and will be omitted here.

Also, although a plurality of the unlocking means 270 and 280 is provided in this embodiment, the number is not limited to 2 or more but can also be only one unlocking means 270 by which all locking members 230 and 240 are rotated for the unlocking operation.

In this case, the single operating pin 271 may have a bar-shaped operating lower end which has its length in the extending direction of the moving rail 220 to stretch over each of the locking members 230 and 240.

As shown in FIGS. 12 to 15, a seat moving track assembly according to a third exemplary embodiment of the present invention comprises a lower stationary rail 310 which is mounted on a vehicle body part, an upper moving rail 320 which is mounted on a seat part and is movably coupled to the stationary rail 310, a locking member 330 which is disposed inside of the moving rail 320, an elastic connecting member 350 which is mounted inside of the moving rail 320 to support the locking member 330, and unlocking means 360 which is mounted on the moving rail 320 for operating the locking member 330.

Also, in this embodiment of the present invention, descriptions for the same components as in the first exemplary embodiment will be omitted.

In this embodiment, differently from those in the first and second embodiments, a single locking member 330 and a single elastic connecting member 350 are provided.

The locking member 330 has an input end 334 formed at a front end of a connecting shaft part 331 and extending perpendicular from the connecting shaft part 331.

The unlocking means 360 comprises an operating lever 361, a connecting bracket 362, a return spring 363, etc.

A center part of the operating lever 361 is accommodated in the connecting bracket 362. The operating lever 361 is rotatably coupled to the connecting bracket 362 through a hinge hole 361a where a connecting pin 364 is inserted. The return spring 363 is accommodated in the connecting bracket 362 to be inserted by the connecting pin 364 and has an end part 363a inserted in to a coupling hole 361b of the operating lever 361 to press the operating lever 361 to rotate forward (i.e. clockwise in FIG. 13).

While supporting the operating lever 361 to rotate, the connecting bracket 362 is disposed at a predetermined location in the moving rail 320 and coupled to the moving rail 320 through a coupling hole 362a. As described above, the blind riveting may be used for the coupling.

For the unlocking operation of the locking member 330, when the operating lever 361 is rotated, its rear end 361c is lowered to press the input end 334 of the locking member 330.

FIG. 16A shows a locking state of the seat moving track assembly 300 and FIG. 16B shows an unlocking state thereof.

As shown in FIGS. 16A and 16B, the rear end 361c of the rotating operating lever 361 (refer to FIG. 13) is lowered to contact and press the input end 334 of the locking member 330 thus rotating the locking member 330 in the unlocking direction.

The rotation of the operating lever 361 for the unlocking operation may be accomplished by drawing up a towel bar (not shown) which is combined to a front end part 361d (refer to FIG. 13) of the operating lever 361.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

The invention claimed is:

1. A seat moving track assembly, comprising:
   a stationary rail which has a channel configuration, and has at a lower part of one side thereof recesses formed successively in a lengthwise direction with a uniform pitch and has at an upper part of the other side thereof openings formed successively with the same pitch as the recesses;
   a moving rail which is disposed inside of the stationary rail and has a channel configuration to be movably coupled to the stationary rail, and which has at a lower part of one side thereof first side holes to correspond to the recesses and has at an upper part of the other side thereof second side holes to correspond to the openings;
   a locking member which is rotatably disposed inside of the moving rail and which has, when rotated in one direction, a plurality of first stopping protrusions projecting through the first side holes to be coupled into the recesses of the stationary rail and a plurality of second stopping protrusions projecting through the second side holes to be coupled into the openings of the stationary rail;
   an elastic connecting member which is mounted inside of the moving rail and has a shaft supporting part to rotatably support the locking member and an elastic pressing part to rotate the locking member in one direction; and
   unlocking means which has an operating pin slid by an outer force and rotating the locking member in the other direction to release a coupling between the first stopping protrusions and the recesses and a coupling between the second stopping protrusion and the openings, a connecting block mounted on the moving rail to guide a sliding of the operating pin, and a return spring coupled to the connecting block to support the operating pin.

2. The seat moving track assembly according to claim 1 wherein the locking member has a connecting shaft part rotatably coupled to the shaft supporting part of the elastic connecting member and an input end extending perpendicular from an end part of the connecting shaft part,
   the unlocking means rotates the locking member in the other direction by the operating pin pressing the input end.

3. The seat moving track assembly according to claim 2 wherein the locking member and the elastic connecting member are provided as a plural number respectively to be disposed and mounted front and rear also symmetrically therebetween,
   a plurality of the first side holes and a plurality of the second side holes of the moving rail are provided as a pair respectively to correspond to the locking members and the elastic connecting members,
   the operating pin presses the input ends of a pair of the locking members together and rotates a pair of the locking members together in the other direction.

4. The seat moving track assembly according to claim 3 wherein a plurality of the first stopping protrusions and a plurality of the second protrusions of the locking members have within one locking member the same pitch as the recesses and the openings respectively, but between the locking members there are 180 degree phase differences in the pitches between the first stopping protrusions and between the second stopping protrusions.

5. The seat moving track assembly according to claim 1 wherein the locking member has a connecting shaft part rotatably coupled to the shaft supporting part of the elastic connecting member and an input extending part formed between the connecting shaft part and the first stopping protrusion,
   the unlocking means rotates the locking member in the other direction by the operating pin pressing the input extend part.

6. The seat moving track assembly according to claim 5 wherein the locking member and the elastic connecting member are provided as a plural number respectively to be disposed and mounted front and rear therebetween,
   the first side holes and the second side holes of the moving rail are provided as a pair respectively to correspond to the locking members and the elastic connecting members.

7. The seat moving track assembly according to claim 6 wherein the unlocking means is provided as a plural number to correspond to each locking member.

8. The seat moving track assembly according to claim 7 wherein the locking members and the elastic connecting members are disposed and mounted front and rear as a pair respectively along the moving rail,
   a plurality of the first stopping protrusions and a plurality of the second protrusions of the locking members have within one locking member the same pitch as the recesses and the openings respectively, but between the locking members there are 180 degree phase differences in the pitches between the first stopping protrusions and between the second stopping protrusions.

9. The seat moving track assembly according to claim 6 wherein the locking members and the elastic connecting members are disposed and mounted front and rear as a pair respectively along the moving rail,
   a plurality of the first stopping protrusions and a plurality of the second protrusions of the locking members have within one locking member the same pitch as the recesses and the openings respectively, but between the locking members there are 180 degree phase differences in the pitches between the first stopping protrusions and between the second stopping protrusions.

10. A seat moving track assembly, comprising:

a stationary rail which has a channel configuration, and has at a lower part of one side thereof recesses formed successively in a lengthwise direction with a uniform pitch and has at an upper part of the other side thereof openings formed successively with the same pitch as the recesses;

a moving rail which is disposed inside of the stationary rail and has a channel configuration to be movably coupled to the stationary rail, and which has at a lower part of one side thereof first side holes to correspond to the recesses and has at an upper part of the other side thereof second side holes to correspond to the openings;

a locking member which is rotatably disposed inside of the moving rail and which has, when rotated in one direction, a plurality of first stopping protrusions projecting through the first side holes to be coupled into the recesses of the stationary rail and a plurality of second stopping protrusions projecting through the second side holes to be coupled into the openings of the stationary rail;

an elastic connecting member which is mounted inside of the moving rail and has a shaft supporting part to rotatably support the locking member and an elastic pressing part to rotate the locking member in one direction; and unlocking means which has an operating lever disposed inside of the moving rail and pressed and rotated by an outer force thus rotating the locking member in the other direction to release a coupling between the first stopping protrusions and the recesses and a coupling between the second stopping protrusion and the openings, a connecting bracket mounted inside of the moving rail to support a rotation of the operating lever, and a return spring coupled to the connecting bracket to support the operating lever.

11. The seat moving track assembly according to claim 10 wherein the locking member has a connecting shaft part rotatably coupled to the shaft supporting part of the elastic connecting member and an input end extending perpendicular from an end part of the connecting shaft part, the unlocking means rotates the locking member in the other direction by an end of the operating lever pressing the input end.

* * * * *